(12) United States Patent
Roch

(10) Patent No.: US 9,699,071 B2
(45) Date of Patent: Jul. 4, 2017

(54) CENTRALLY OPTIMIZED VARIABLE LENGTH CODING FOR SOURCE ROUTED MULTICAST

(71) Applicant: Huawei Technologies Co., Ltd., Shenzhen (CN)

(72) Inventor: Evelyne Roch, Gatineau (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 14/574,059

(22) Filed: Dec. 17, 2014

(65) Prior Publication Data

US 2015/0312136 A1   Oct. 29, 2015

Related U.S. Application Data

(60) Provisional application No. 61/985,227, filed on Apr. 28, 2014.

(51) Int. Cl.
*H04L 1/00* (2006.01)
*H04L 12/761* (2013.01)
(Continued)

(52) U.S. Cl.
CPC ............ *H04L 45/16* (2013.01); *H04L 12/185* (2013.01); *H04L 45/74* (2013.01)

(58) Field of Classification Search
CPC ....... H04L 12/56; H04L 12/18; H04L 12/185; H04L 45/16; H04L 49/201;
(Continued)

(56) References Cited

U.S. PATENT DOCUMENTS 6,717,942 B1   4/2004 Dally et al.
6,778,536 B1 * 8/2004 Ofek ................... H04L 12/5693
                                                 370/395.4
(Continued)

FOREIGN PATENT DOCUMENTS

| | | |
|---|---|---|
| CN | 101557349 A | 10/2009 |
| EP | 2319215 A1 | 5/2011 |
| WO | 2010022799 A1 | 3/2010 |

OTHER PUBLICATIONS

Tak-Shing Peter Yum, et al., "Multicast Source Routing in Packet-Switched Networks", IEEE, 1991, p. 1284-1288.
(Continued)

*Primary Examiner* — Dady Chery
(74) *Attorney, Agent, or Firm* — Slater Matsil, LLP

(57) ABSTRACT

A system, controller and method having centrally optimized coding for a source routed forwarding based multicast network. The network comprises a plurality of nodes configured to transfer data packets to one another via a plurality of links. A controller is configured to control each of the nodes, and is configured to control forwarding of the data packets by establishing a header for each flow. The header defines a path for the flow of the data packets from a source to multiple destinations, wherein the length of the header is a function of the nodes and the branches in the path. The multicast path is represented as a header that consists of codewords representing interfaces, links and instructions. Some of the codewords are assigned different lengths in order to reduce the size of the header. Other codewords have a fixed size comprising a bit field.

26 Claims, 11 Drawing Sheets

(51) Int. Cl.
*H04L 12/18* (2006.01)
*H04L 12/741* (2013.01)

(58) Field of Classification Search
CPC ............... H04L 29/06095; H04L 45/74; H04L 49/3009; H04L 49/309
USPC .................................................. 370/389, 392
See application file for complete search history.

(56) References Cited

U.S. PATENT DOCUMENTS

| | | |
|---|---|---|
| 7,016,351 B1 | 3/2006 | Farinacci et al. |
| 7,801,136 B2 | 9/2010 | Tian |
| 2010/0118874 A1* | 5/2010 | Li .......................... H04L 45/00 370/389 |
| 2014/0098675 A1 | 4/2014 | Frost et al. |

OTHER PUBLICATIONS

Tak-Shing Peter Yum, et al., "Multicast Source Routing in Packet-Switched Networks", IEEE Transactions on Communications, vol. 42, Feb./Mar./Apr. 1994, p. 1212-1215.
Ashwood-Smith, P., et al, "SDN State Reduction; draft-ashwood-sdnrg-state-reduction-00.txt", Jul. 3, 2013, XP15094727, 23 pages.

\* cited by examiner

FIG. 5A

FROM FIG. 5A

FIG. 5B

| | | 30 | | E-F | | | | | | | | | | | F-G | | | G-G3 | | G-G6 | | G-G8 | G-H | | | | H-H6 | H-H7 | | |
|---|---|---|---|---|---|---|---|---|---|---|---|---|---|---|---|---|---|---|---|---|---|---|---|---|---|---|---|---|---|---|
| 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 |
| 0 | 0 | 0 | 0 | 0 | 0 | 1 | 0 | 0 | 0 | 0 | 0 | 0 | 0 | 0 | 1 | 0 | 0 | 1 | 0 | 0 | 1 | 0 | 1 | 1 | 0 | 0 | 0 | 0 | 1 | 1 | 0 |

(Row 32, same values as row 30)

(Row 34: starts with 0s, first 1 at col 57)
| 0 | 0 | 0 | 0 | 0 | 0 | 0 | 0 | 0 | 0 | 0 | 0 | 0 | 0 | 0 | 1 | 0 | 0 | 1 | 0 | 0 | 1 | 0 | 1 | 1 | 0 | 0 | 0 | 0 | 1 | 1 | 0 |

(Row 36, same as 34)

(Row 38: all 0 except last few: ...0 0 0 0 1 1 0)

(Row 40: all 0)

CENTRALLY OPTIMIZED VARIABLE LENGTH CODING FOR SOURCE ROUTED MULTICAST

CROSS-REFERENCE TO RELATED APPLICATIONS

The present application claims priority to U.S. Provisional Patent Application No. 61/985,227 filed Apr. 28, 2014 by Roch and entitled "CENTRALLY OPTIMIZED VARIABLE LENGTH CODING FOR SOURCE ROUTED MULTICAST", which is incorporated herein by reference as if reproduced in its entirety.

TECHNICAL FIELD

The present invention is generally directed to network communications, and more particularly to source routed forwarding solutions for multicast traffic.

BACKGROUND

Source routed forwarding solutions for multicast traffic are space consuming, limiting usage to very small multicast trees. Source routed multicast headers typically include multi-protocol label switching (MPLS) based stacked headers requiring a fixed 32 bits per label stack entry, each header representing an output interface. During the source routed forwarding of data packets through the network, each of the intermediate nodes in the network receiving the data packet looks at the packet header to determine the next hop for the data packet. A source routed multicast tree may be represented by adding a header label entry for each link. Each link has two interfaces, one at each end of the link and therefore an entry may also be represented by inserting a header label for an outgoing interface for that link. The more links are traversed by each data packet, the more overhead that is added.

For large multicast trees, i.e. traversing a large number of links, this fixed size header label approach for each link is not efficient, and limits the size of multicast trees.

SUMMARY

This disclosure is directed to a centrally optimized variable length coding scheme for a source routed forwarding based multicast network.

In one embodiment, a source routed forwarding network comprises a plurality of nodes configured to transfer data packets to one another via a plurality of links, each link transferring the data packets to a respective node. A controller is configured to control each of the plurality of nodes, and is configured to control the forwarding of the data packets by establishing a header for each flow and instructing the source node to prepend the header to data packets for the flow. The header defines a path of the data packet from a source to multiple destinations, wherein the length of the header is a function of the nodes and the links in the path and in the network.

In some embodiments, the header includes a variable-length codeword representing the set of codewords used in the data packet header. Codewords have built-in length, i.e. they do not have a length field as the length is inferred from the codeword itself.

In some embodiments, the controller is configured to monitor the length of the header associated with a flow, and establish a different set of codewords for that flow when the length of the header exceeds a predetermined threshold.

In some embodiments, each of the links in the network is represented as a unique variable-length codeword, each of the codewords collectively comprising the header. Each of the nodes in the path is configured to process the data packet and remove its respective codeword(s) from the header before passing the data packet to the next node(s) on the said link(s). In some embodiments, the controller assigns a codeword to other representations such as the end of the header. The controller is configured to provide the set of codewords to each of the nodes in the network and the mapping of each codeword to a link or other representation.

In some embodiments, a single codeword is assigned to represent multiple links. In this codeword, each link is represented as a bit field, i.e. set to 0 or 1, to represent forwarding on the link.

In another embodiment, a controller is configured to establish a unique codeword for each of the plurality of nodes in the network and to establish a codeword for the plurality of links that is unique for each node, each of the codewords collectively comprising the header. In some embodiments, the controller assigns a codeword to represent the other instructions such as the end of the header, instruction to remove codewords, instructions to exclude links associated with the codewords and instructions to broadcast on all links except the incoming link. In some embodiments, the controller is configured to instruct each of the nodes in the path to process the data packet and remove its respective codeword(s) representing the local node and outgoing link(s) from the header before passing the data packet to the next said node(s) over the outgoing link(s). The controller is configured to provide the codewords of every node and link in the network to each of the nodes in the network and the mapping of each codeword assigned to the node local outgoing interfaces. The controller is configured to establish the header to include codewords for each of the plurality of links in the path where each said links at a particular node is represented by a codeword representing the node and a set of codewords representing the outgoing interfaces. In some embodiments, the controller is configured to establish the header to comprise codewords that represent the links that are excluded from receiving the data packet. In some embodiments, the controller is configured to establish the header to comprise codewords that represent broadcasting on all links at a node, i.e. the data packet is forwarded on all links except the incoming link.

In another embodiment, a controller establishes a unique codeword at each node for each of the plurality of links, each of the codewords collectively comprising the header. In some embodiments, the controller establishes each of the nodes in the path to process the data packet and remove its respective codeword from the header before passing the data packet to the next said node. In some embodiments, the controller assigns a codeword for other representations such as the end of the header, instruction to remove codewords, excluding links associated with codewords, broadcasting on all links except incoming link, structured branch entry and structured branch exit representations. The controller provides the entire set of codewords to every node and the mapping of each codeword to a local outgoing interface or other representation. The controller establishes the header to include a codeword for each of the plurality of links in the path where each said links at a particular node will have a set of embedded codewords, between codewords presenting the branch entry and exit points, to represent the multicast tree downstream of that link.

In another embodiment, a controller establishes some of the codewords having different lengths. Some of the codewords have different lengths to reduce the size of the header but codewords have built-in length so no additional length field is necessary.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 5A and 5B illustrate the headers of a data packet for an embodiment having fixed length codewords comprising a bit field including packet forwarding;

DETAILED DESCRIPTION

Figure 1:
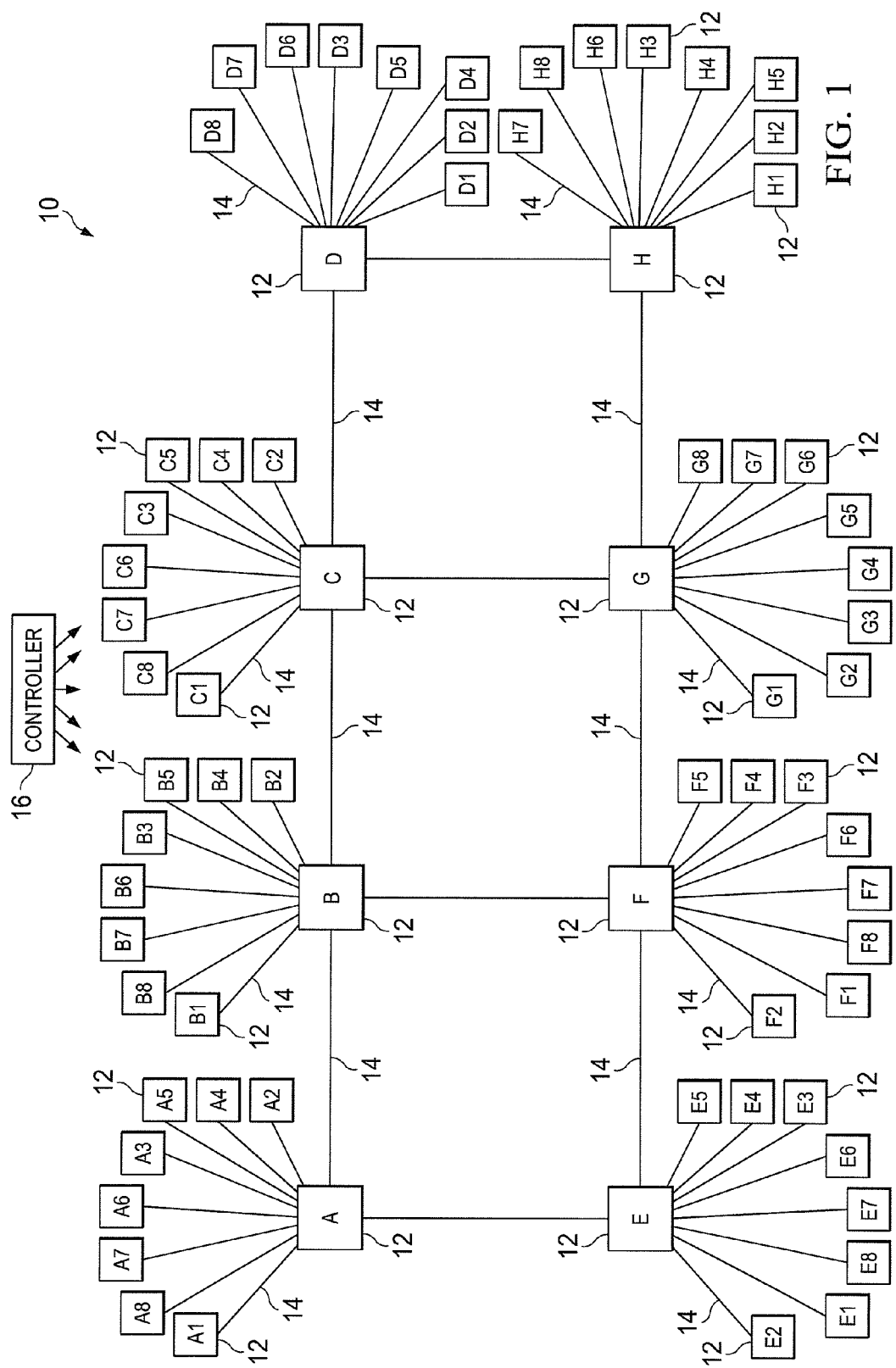
FIG. 1 illustrates a multicast network having a controller, and a plurality of nodes each having a plurality of links.

Referring to FIG. 1, there is shown a multicast network 10 comprising a plurality of nodes 12 each having a plurality of links. According to this disclosure, a software defined networking (SDN) or central network controller 16 gathers all the network topology including all nodes and links, including operator provisioned or automatically discovered optional input such as existing or planned multicast traffic flows or additional planned nodes or additional planned links.

The controller 16 assigns several codewords and downloads the set of codewords to all the nodes 12. The controller 16 computes a multicast tree 18 for a multicast traffic source and sends the encoded tree to the source node. The source node adds the encoded tree to the header. The source node and all subsequent nodes process the header as follows:

If there are multiple sets of codewords used, identify the set of codewords used (if present—it is not present in this particular example), and Process the header as per the rules associated with the identified set of codewords.

As new receivers are added to multicast trees 18 or new trees 18 are created, the network controller 16 updates the headers for the flows and monitors the header size and re-optimizes the chosen set of codewords as necessary.

In an embodiment of this disclosure, the controller 16 assigns variable-length globally unique codewords to all links in the network 10. The codewords may be Huffman or Shannon-Fano coded, or other lossless coding techniques may be employed if desired. These codewords do not have to be ordered but they could be ordered to minimize searching by putting entries encountered first and removing the entries as they are processed. The controller 16 determines the number of links in the network 10 to determine the number of link symbols required, and then assigns a probability to each symbol based on the relative probability that it will occur in a header. The controller computes variable-length codewords for all symbols based on their relative priority, wherein the codewords assigned to all links are shown in Table 1-1 below:

TABLE 1-1

| Symbol | Probability | Variable-Length Code |
|---|---|---|
| end_header_code | 10 | 10 |
| link_A-A1 | 1 | 1101000 |
| link_A-A2 | 1 | 1101001 |
| link_A-A3 | 1 | 1101110 |
| link_A-A4 | 1 | 1101111 |
| link_A-A5 | 1 | 1101100 |
| link_A-A6 | 1 | 1101101 |
| link_A-A7 | 1 | 1100010 |
| link_A-A8 | 1 | 1100011 |
| link_A-B | 5 | 11 |
| link_A-E | 5 | 0 |
| link_B-B1 | 1 | 1100000 |
| link_B-B2 | 1 | 1100001 |
| link_B-B3 | 1 | 1100110 |
| link_B-B4 | 1 | 1100111 |
| link_B-B5 | 1 | 1100100 |
| link_B-B6 | 1 | 1100101 |
| link_B-B7 | 1 | 1111010 |
| link_B-B8 | 1 | 1111011 |
| link_B-C | 5 | 1 |
| link_B-F | 3 | 101 |
| link_C-C1 | 1 | 1111000 |
| link_C-C2 | 1 | 1111001 |
| link_C-C3 | 1 | 1111110 |
| link_C-C4 | 1 | 1111111 |
| link_C-C5 | 1 | 1111100 |
| link_C-C6 | 1 | 1111101 |
| link_C-C7 | 1 | 1110010 |
| link_C-C8 | 1 | 1110011 |
| link_C-D | 4 | 1110 |
| link_C-G | 2 | 110101 |
| link_D-D1 | 1 | 1110000 |
| link_D-D2 | 1 | 1110001 |
| link_D-D3 | 1 | 1110110 |
| link_D-D4 | 1 | 1110111 |
| link_D-D5 | 1 | 1110100 |
| link_D-D6 | 1 | 1110101 |
| link_D-D7 | 1 | 1001010 |
| link_D-D8 | 1 | 1001011 |
| link_D-H | 4 | 1111 |
| link_E-E1 | 1 | 1001000 |
| link_E-E2 | 1 | 1001001 |
| link_E-E3 | 1 | 1001110 |
| link_E-E4 | 1 | 1001111 |
| link_E-E5 | 1 | 1001100 |
| link_E-E6 | 1 | 1001101 |
| link_E-E7 | 1 | 1000010 |
| link_E-E8 | 1 | 1000011 |
| link_E-F | 3 | 1100 |
| link_F-F1 | 1 | 1000000 |
| link_F-F2 | 1 | 1000001 |
| link_F-F3 | 1 | 1000110 |

TABLE 1-1-continued

| Symbol | Probability | Variable-Length Code |
|---|---|---|
| link_F-F4 | 1 | 1000111 |
| link_F-F5 | 1 | 1000100 |
| link_F-F6 | 1 | 1000101 |
| link_F-F7 | 1 | 1011010 |
| link_F-F8 | 1 | 1011011 |
| link_F-G | 1.5 | 11010 |
| link_G-G1 | 1 | 1011000 |
| link_G-G2 | 1 | 1011001 |
| link_G-G3 | 1 | 1011110 |
| link_G-G4 | 1 | 1011111 |
| link_G-G5 | 1 | 1011100 |
| link_G-G6 | 1 | 1011101 |
| link_G-G7 | 1 | 1010010 |
| link_G-G8 | 1 | 1010011 |
| link_G-H | 2 | 100 |
| link_H-H1 | 1 | 1010000 |
| link_H-H2 | 1 | 1010001 |
| link_H-H3 | 1 | 1010110 |
| link_H-H4 | 1 | 1010111 |
| link_H-H5 | 1 | 1010100 |
| link_H-H6 | 1 | 1010101 |
| link_H-H7 | 1 | 110110 |
| link_H-H8 | 1 | 110111 |

The controller 16 then informs the nodes 12 of the codewords, and each node 12 receives the entire table and recognizes its local links. An example of a controller central assignment of variable-length codewords for network 10 as distributed to the nodes 12 is shown in Tables 2-1 below:

TABLE 2-1

| Symbol | Variable-Length Code |
|---|---|
| end_header_code | 010 |
| link_A-A1 | 1101000 |
| link_A-A2 | 1101001 |
| link_A-A3 | 1101110 |
| link_A-A4 | 1101111 |
| link_A-A5 | 1101100 |
| link_A-A6 | 1101101 |
| link_A-A7 | 1100010 |
| link_A-A8 | 1100011 |
| link_A-B | 0011 |
| link_A-E | 0000 |
| link_B-B1 | 1100000 |
| link_B-B2 | 1100001 |
| link_B-B3 | 1100110 |
| link_B-B4 | 1100111 |
| link_B-B5 | 1100100 |
| link_B-B6 | 1100101 |
| link_B-B7 | 1111010 |
| link_B-B8 | 1111011 |
| link_B-C | 0001 |
| link_B-F | 00101 |
| link_C-C1 | 1111000 |
| link_C-C2 | 1111001 |
| link_C-C3 | 1111110 |
| link_C-C4 | 1111111 |
| link_C-C5 | 1111100 |
| link_C-C6 | 1111101 |
| link_C-C7 | 1110010 |
| link_C-C8 | 1110011 |
| link_C-D | 01110 |
| link_C-G | 110101 |
| link_D-D1 | 1110000 |
| link_D-D2 | 1110001 |
| link_D-D3 | 1110110 |
| link_D-D4 | 1110111 |
| link_D-D5 | 1110100 |
| link_D-D6 | 1110101 |
| link_D-D7 | 1001010 |
| link_D-D8 | 1001011 |
| link_D-H | 01111 |

TABLE 2-1-continued

| Symbol | Variable-Length Code |
|---|---|
| link_E-E1 | 1001000 |
| link_E-E2 | 1001001 |
| link_E-E3 | 1001110 |
| link_E-E4 | 1001111 |
| link_E-E5 | 1001100 |
| link_E-E6 | 1001101 |
| link_E-E7 | 1000010 |
| link_E-E8 | 1000011 |
| link_E-F | 01100 |
| link_F-F1 | 1000000 |
| link_F-F2 | 1000001 |
| link_F-F3 | 1000110 |
| link_F-F4 | 1000111 |
| link_F-F5 | 1000100 |
| link_F-F6 | 1000101 |
| link_F-F7 | 1011010 |
| link_F-F8 | 1011011 |
| link_F-G | 011010 |
| link_G-G1 | 1011000 |
| link_G-G2 | 1011001 |
| link_G-G3 | 1011110 |
| link_G-G4 | 1011111 |
| link_G-G5 | 1011100 |
| link_G-G6 | 1011101 |
| link_G-G7 | 1010010 |
| link_G-G8 | 1010011 |
| link_G-H | 00100 |
| link_H-H1 | 1010000 |
| link_H-H2 | 1010001 |
| link_H-H3 | 1010110 |
| link_H-H4 | 1010111 |
| link_H-H5 | 1010100 |
| link_H-H6 | 1010101 |
| link_H-H7 | 0110110 |
| link_H-H8 | 0110111 |

Figure 2:
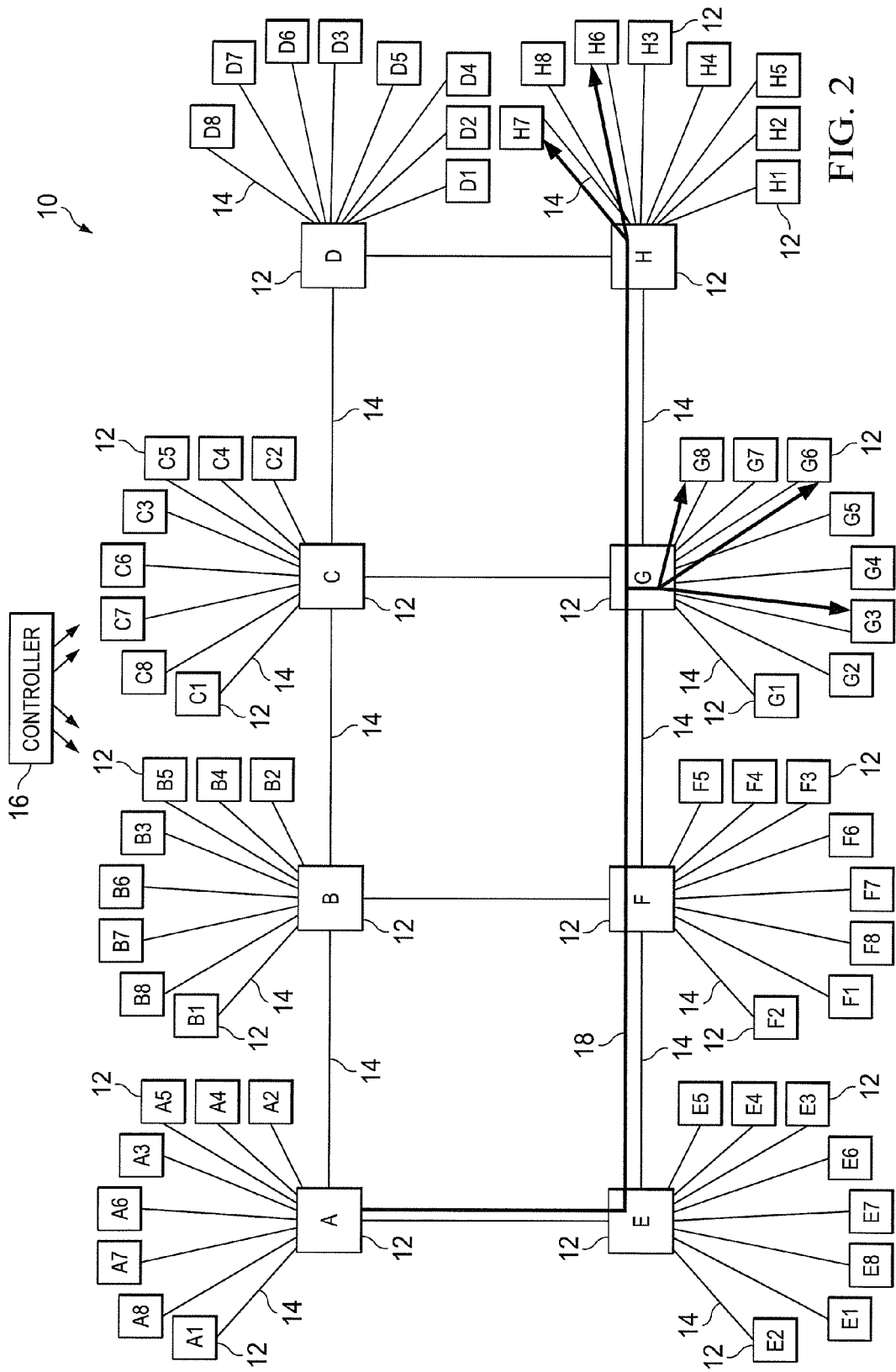
FIG. 2 illustrates the multicast network showing the links in the path that the data packets traverses according to one embodiment.
Figure 3:
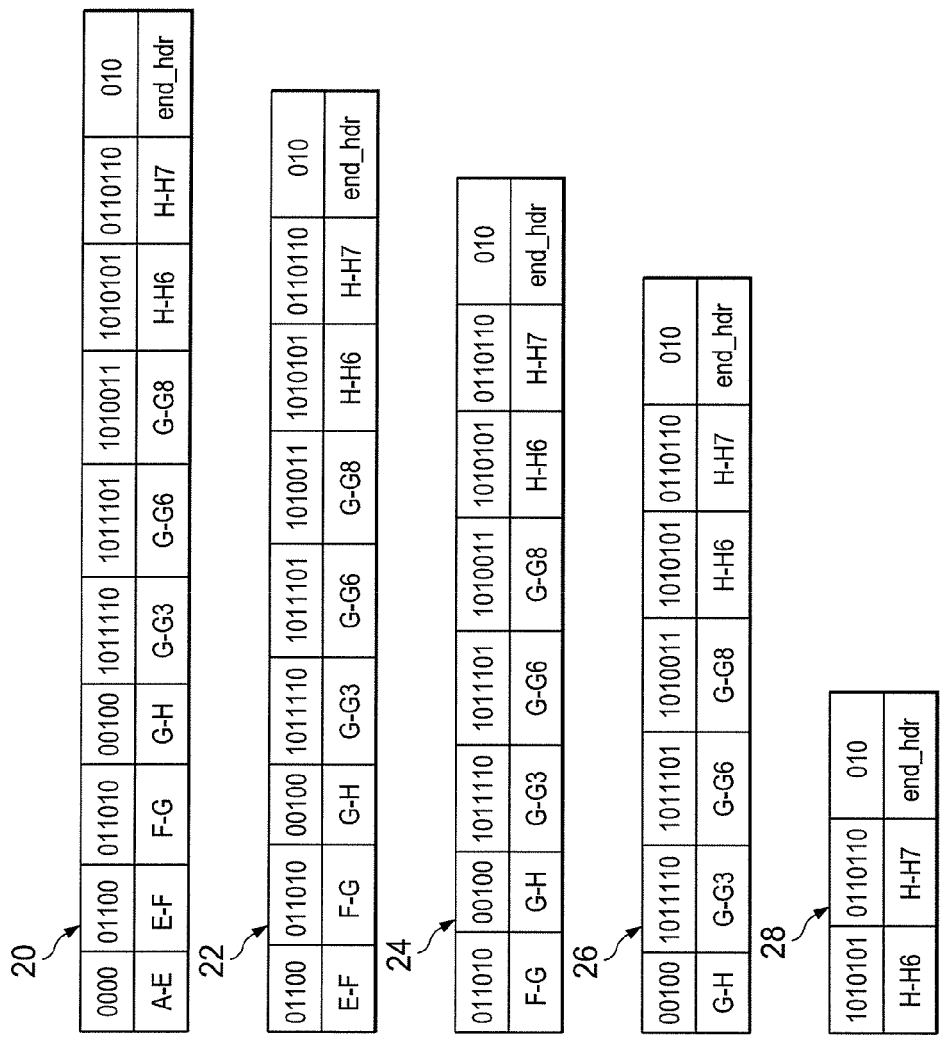
FIG. 3 illustrates the headers of a data packet that includes the codewords of all links that the data packet in the multicast tree traverses through according to one embodiment, and the removal of the previous header after each hop of the data packet.

The header of a data packet includes the codewords of all links that the data packets in a multicast tree 18 traverse through network 10 as shown in FIG. 2. At each node 12 of the tree 18 that the data packet traverses, the local links are removed from the data packet (or marked by changing the codeword to a processed codeword value) before the data packet is forwarded on all local links found in the header, as shown in FIG. 3. The process continues until the end of the list (after node H) or the data packet cannot find local links in the list (at nodes G3, G6 and G8), where:

<header> ::= <link_list> <end_header_code>
<link_list> ::= <link_code>  | [<link_list>]

Referring to FIG. 3, the controller 16 provides the header shown at 20 to node A for use in the particular traffic flow of a data packet for tree 18 illustrated in FIG. 2. At each node, the codewords corresponding to local outgoing links over which the packet is to be forwarded are removed, and the remaining header is forwarded to the next node over the said local outgoing links that were removed from the header. For instance, when a data packet is received and the header 20 is inserted at node A, the header is used to determine that the data packet is to be forwarded from node A to node E. The codeword corresponding to link A-E is removed, as shown at 22 before sending the packet over outgoing link A-E. When the header 22 is received at node E, the header is used to determine that the data packet is to be forwarded from node E to node F over link E-F. The codeword corresponding to link E-F is removed as shown at 24. When the header 24 is received at node F, the header is used to determine that the data packet is to be forwarded from node F to node G over link F-G. The codeword corresponding to link F-G is removed as shown at 26. When the header 26 is received at node G, the header is used to determine that the data packet is to be forwarded from node F to nodes G3, G6, G8 and H over links G-G3, G-G6, G-G8 and G-H. The codewords corresponding to links G-G3, G-G6, G-G8 and G-H are removed as shown at 28. When the header 28 is received at node H, the header is used to determine that the data packet is to be forwarded from node H to nodes H6 and H7 over links H-H6 and H-H7. The codewords corresponding to links H-H6 and H-H7 are removed and since there are no more entries left in the header, the header is removed before forwarding the data packet over links H-H6 and H-H7. In this illustration, when the data packet with header 28 reaches each of the receivers G3, G6 and G8, the only interfaces left for the data packet in the multicast tree, i.e. H-H6 and H-H7 are not local so the header is removed. This process illustrates the data packet forwarding from node to node until the data packet reaches each of its receivers.

Figure 4:
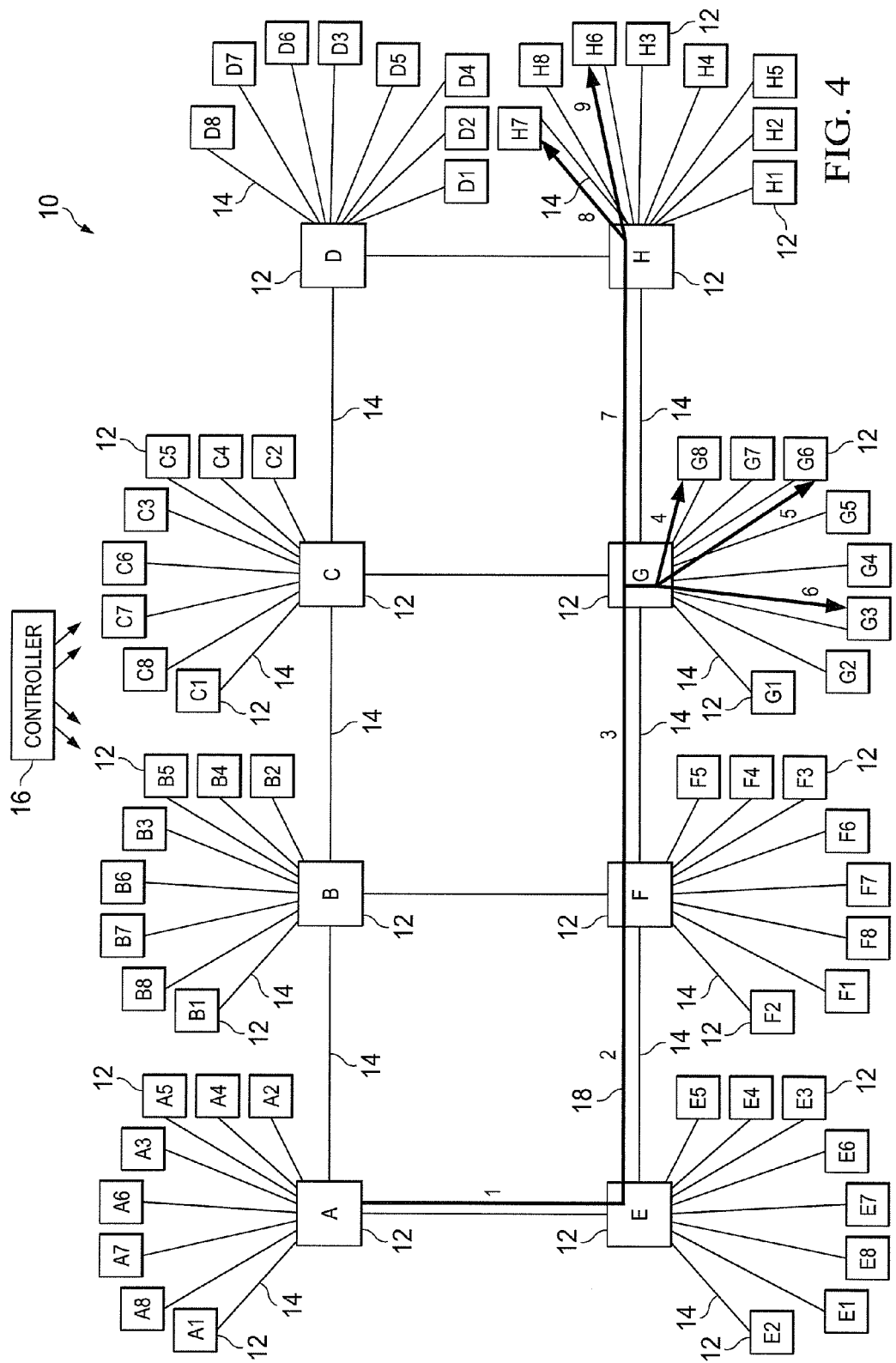
FIG. 4 illustrates the multicast network illustrating the path of a data packet according to another embodiment.

According to another embodiment of the disclosure, a fixed length codeword may be used and configured as a bit-field. The fixed size bit-field may be used to represent whether traffic should be forwarding on a link where forwarding on a link is represented by a bit with a fixed position within the codeword. There is no need to have an end of header codeword as the codeword is fixed size. The example network 10 has 74 links as shown in FIG. 4, so there is a minimum 74 bit representation for all links, such as illustrated in Table 3-1:

TABLE 3-1

| Symbol | bitfield position |
|---|---|
| link_A-A1 | 1 |
| link_A-A2 | 2 |
| link_A-A3 | 3 |
| link_A-A4 | 4 |
| link_A-A5 | 5 |
| link_A-A6 | 6 |
| link_A-A7 | 7 |
| link_A-A8 | 8 |
| link_A-B | 9 |
| link_A-E | 10 |
| link_B-B1 | 11 |
| link_B-B2 | 12 |
| link_B-B3 | 13 |
| link_B-B4 | 14 |
| link_B-B5 | 15 |
| link_B-B6 | 16 |
| link_B-B7 | 17 |
| link_B-B8 | 18 |
| link_B-C | 19 |
| link_B-F | 20 |
| link_C-C1 | 21 |
| link_C-C2 | 22 |
| link_C-C3 | 23 |
| link_C-C4 | 24 |
| link_C-C5 | 25 |
| link_C-C6 | 26 |
| link_C-C7 | 27 |
| link_C-C8 | 28 |
| link_C-D | 29 |
| link_C-G | 30 |
| link_D-D1 | 31 |
| link_D-D2 | 32 |
| link_D-D3 | 33 |
| link_D-D4 | 34 |
| link_D-D5 | 35 |
| link_D-D6 | 36 |
| link_D-D7 | 37 |
| link_D-D8 | 38 |
| link_D-H | 39 |
| link_E-E1 | 40 |
| link_E-E2 | 41 |
| link_E-E3 | 42 |

TABLE 3-1-continued

| Symbol | bitfield position |
|---|---|
| link_E-E4 | 43 |
| link_E-E5 | 44 |
| link_E-E6 | 45 |
| link_E-E7 | 46 |
| link_E-E8 | 47 |
| link_E-F | 48 |
| link_F-F1 | 49 |
| link_F-F2 | 50 |
| link_F-F3 | 51 |
| link_F-F4 | 52 |
| link_F-F5 | 53 |
| link_F-F6 | 54 |
| link_F-F7 | 55 |
| link_F-F8 | 56 |
| link_F-G | 57 |
| link_G-G1 | 58 |
| link_G-G2 | 59 |
| link_G-G3 | 60 |
| link_G-G4 | 61 |
| link_G-G5 | 62 |
| link_G-G6 | 63 |
| link_G-G7 | 64 |
| link_G-G8 | 65 |
| link_G-H | 66 |
| link_H-H1 | 67 |
| link_H-H2 | 68 |
| link_H-H3 | 69 |
| link_H-H4 | 70 |
| link_H-H5 | 71 |
| link_H-H6 | 72 |
| link_H-H7 | 73 |
| link_H-H8 | 74 |

The controller 16 informs each node of the header size of each packet, which may be larger than the number of links, such as 80 bits. The controller 16 also informs each node of each bit field position associated with the local links for its node. For instance, node A is informed of all links associated with node A such as shown in Table 3-4 below, node B is informed of all links associated with node B as shown in Table 3-5, and so on.

TABLE 3-4

| Symbol | bitfield position |
|---|---|
| link_A-A1 | 1 |
| link_A-A2 | 2 |
| link_A-A3 | 3 |
| link_A-A4 | 4 |
| link_A-A5 | 5 |
| link_A-A6 | 6 |
| link_A-A7 | 7 |
| link_A-A8 | 8 |
| link_A-B | 9 |
| link_A-E | 10 |

TABLE 3-5

| Symbol | bitfield position |
|---|---|
| link_A-B | 9 |
| link_B-B1 | 11 |
| link_B-B2 | 12 |
| link_B-B3 | 13 |
| link_B-B4 | 14 |
| link_B-B5 | 15 |
| link_B-B6 | 16 |
| link_B-B7 | 17 |
| link_B-B8 | 18 |
| link_B-C | 19 |
| link_B-F | 20 |

During forwarding of a data packet, each node 12 processes the header, identifying its links' bit value. For all local links identified in network 10 of FIG. 4, the packet will be sent. Before replicating the packet, all local links are set to 0, then the packet is replicated and sent on all local links set to 1 prior to resetting them. This avoids loops. This forwarding completes when all bits are 0 (at node H) or cannot find local links (at nodes G3, G6 and G8).

Figure 5A:
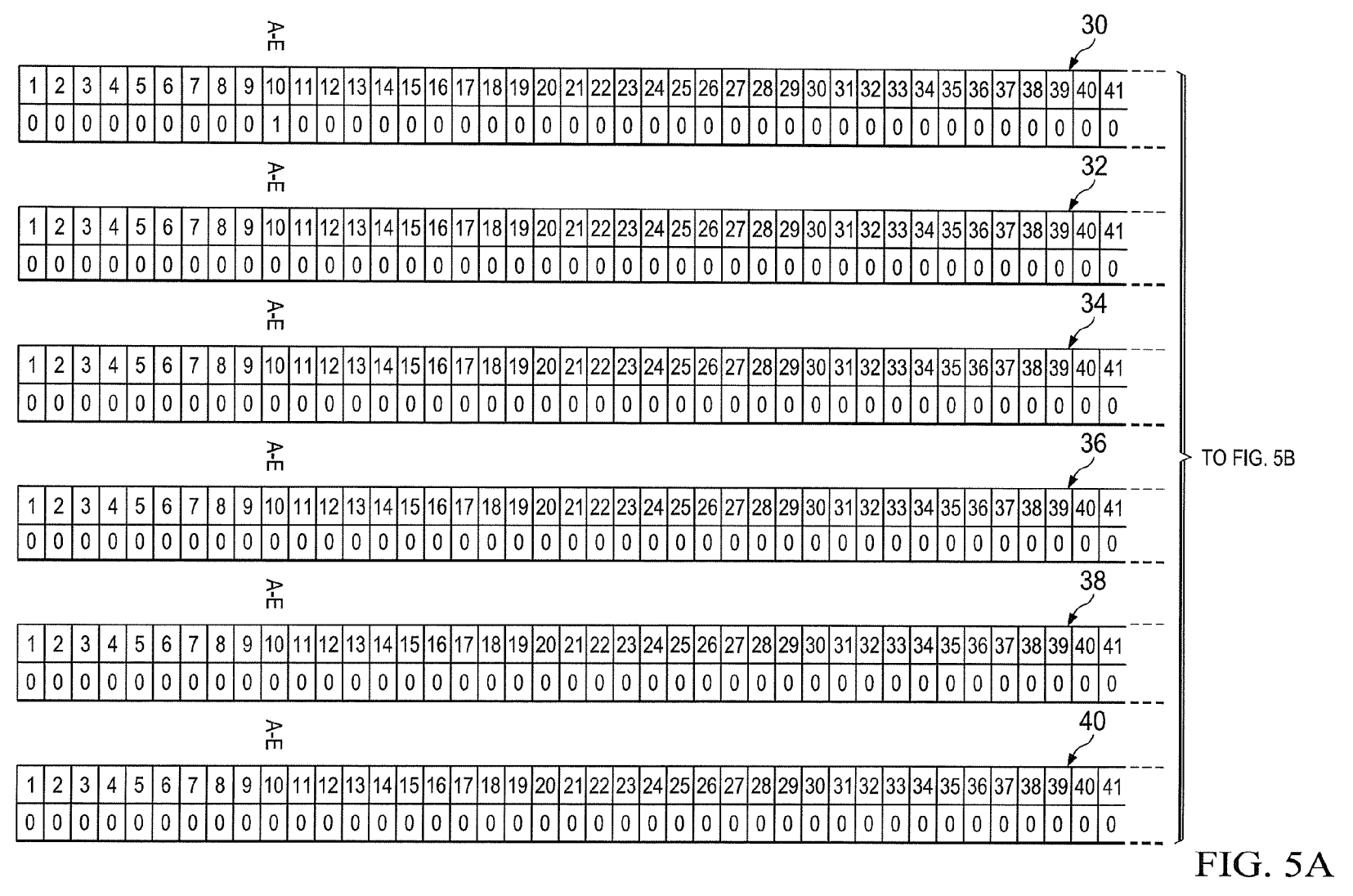

Referring to FIGS. 5A-5B, the controller 16 provides a header shown at 30 with an ordered set of codewords to node A for use for the particular traffic flow shown in FIG. 4. Each outgoing link used to forward the data packet has its bit field set to "1". Before the data packet is sent to a next node over the outgoing links, the bit fields associated with the outgoing links are set to "0". For instance, before the data packet is sent from node A to node E, the bit field for link A-E is set as a "0", as shown at 32. Before the data packet is sent from node E to node F, the bit field for link E-F is set to "0", as shown at 34. Before forwarding from node F to node G, the associated bit field for link F-G is set to "0" as shown at 36. Before forwarding to the over links G-G3, G-G6, G-G8 and G-H, the associated bit fields are set to "0" as shown at 38. Before forwarding to the H6 and H7 nodes, all bit field entries are "0" and the header is removed as shown at 40.

According to another embodiment of this disclosure, variable length globally unique node/link/action codewords may be utilized to represent multicast trees. This method is based on the assignment of globally unique codewords to global scoped nodes, nodal scoped interfaces and global/nodal scoped actions by the controller. The codewords could be Huffman or Shannon-Fano coding or other lossless coding techniques but codewords assigned to the nodes, interfaces/links and actions come from the same set of codewords. The header includes a coded representation of all outgoing interfaces over which to send the data packet at a particular node. Each node parses the ordered set of codewords to find its nodal entry, and then parses the codeword entries until the next node entry, mapping each entry to a interfaces/links and other representations to determine over which interface(s) to send the data packet. The node id and instructions are all encoded so the node translates the codewords to locally significant interfaces to send the traffic to. Actions include an exclusion list (except the interface over which the data packet was received), broadcast/send on all (except the interface over which the data packet was received), and remove this level of multicast header if applicable.

Figure 6:
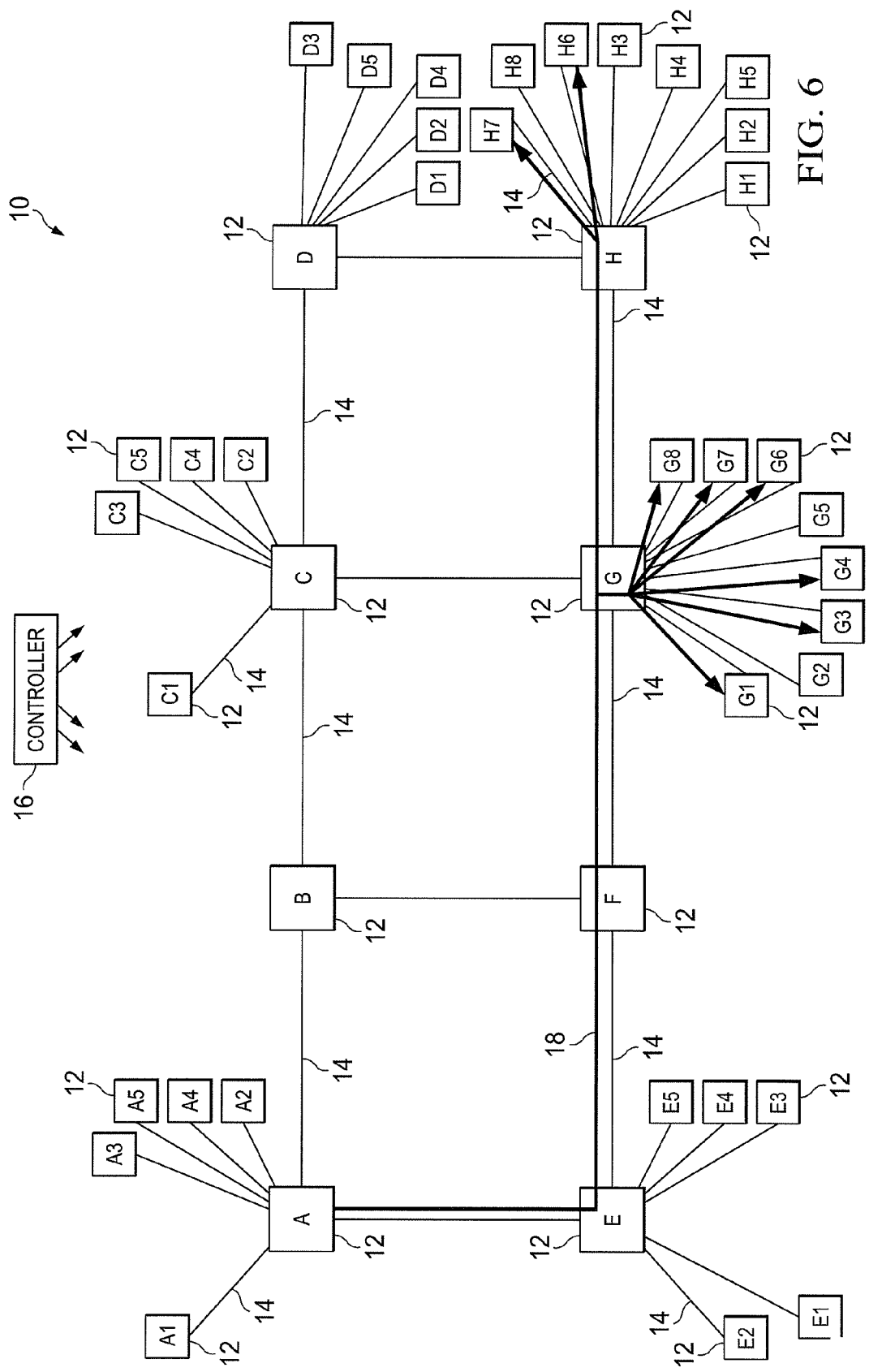
FIG. 6 illustrates the multicast network illustrating the path of a data packet according to another embodiment.

An example is shown in FIG. 6 where network 10 is shown simplified, illustrating routing through Node A (over outgoing interface A->E), Node E (over outgoing interface E->F), Node F (over outgoing interface F->G), Node G (over all interfaces Excluding incoming interface and Excluding outgoing interfaces G->G2 and G->G5), Node H (over outgoing interfaces H->H6 and H->H7). Entry removal is optional, allowing a smaller header but a loss of info about origin of the data packet. The header is as follows:

```
<header> ::= <node_instructions> <end_header_code>
<node_instructions> ::= <node_code> [<remove_code>]
  [<exclusion_code> | <bcast_code>] <list_of_interface_codes>
  [<node_instructions>]
<list_of_interface_codes> ::= <interface_code>
  [<list_of_interface_codes>]
```

The controller 16 executes multiple steps. First, it determines the number of symbols required. It finds the number of nodes to determine the number of node symbols required. It finds the number of interfaces for each node to determine the number of interface symbols required. It determines the number of action codes required for exclusion, broadcast, remove and end of header codes. It then assigns a probability to each symbol. Then, the controller 16 computes variable-length codewords for all symbols as shown in Table 4-1 below:

TABLE 4-1

| Symbol | Probability | Variable-Length Code |
|---|---|---|
| code_bcast | 2 | 10001 |
| code_delete | 2 | 10100 |
| code_end_header | 10 | 110 |
| code_exclude | 5 | 1011 |
| Interface_1 | 3 | 10101 |
| Interface_10 | 3 | 0000 |
| Interface_11 | 3 | 0001 |
| Interface_2 | 3 | 0100 |
| Interface_3 | 3 | 0101 |
| Interface_4 | 3 | 11110 |
| Interface_5 | 3 | 11111 |
| Interface_6 | 3 | 11100 |
| Interface_7 | 3 | 11101 |
| Interface_8 | 3 | 0010 |
| Interface_9 | 3 | 0011 |
| Node_A | 1 | 011100 |
| Node_B | 2 | 01111 |
| Node_C | 2 | 01100 |
| Node_D | 1 | 011101 |
| Node_E | 2 | 01101 |
| Node_F | 2 | 10010 |
| Node_G | 2 | 10011 |
| Node_H | 2 | 10000 |

The controller 16 informs each of the nodes of the entire set of codewords as shown in Table 4-2 below:

TABLE 4-2

| Symbol | Variable-Length Code |
|---|---|
| code_bcast | 10001 |
| code_delete | 10100 |
| code_end_header | 110 |
| code_exclude | 1011 |
| Interface_1 | 10101 |
| Interface_10 | 0000 |
| Interface_11 | 0001 |
| Interface_2 | 0100 |
| Interface_3 | 0101 |
| Interface_4 | 11110 |
| Interface_5 | 11111 |
| Interface_6 | 11100 |
| Interface_7 | 11101 |
| Interface_8 | 0010 |
| Interface_9 | 0011 |
| Node_A | 011100 |
| Node_B | 01111 |
| Node_C | 01100 |
| Node_D | 011101 |
| Node_E | 01101 |
| Node_F | 10010 |
| Node_G | 10011 |
| Node_H | 10000 |

In addition, the controller sends to each node a local mapping of interface symbols to each local interface. Note that this information may be combined with the contents of Table 4-2 for each node. For instance, the interface symbols send to node A is shown in Table 4-3 below, the interface symbols for node F are shown in Table 4-4, the interface symbols sent to node G are shown in Table 4-5, the interface symbols sent to node E are shown in Table 4-6, and the interface symbols sent to node H are shown in Table 4-7:

TABLE 4-3

| Symbol | Local Interface |
|---|---|
| Interface_1 | Not applicable |
| Interface_10 | A-B |
| Interface_11 | A-A1 |
| Interface_2 | Not applicable |
| Interface_3 | Not applicable |
| Interface_4 | Not applicable |
| Interface_5 | A-A5 |
| Interface_6 | A-A4 |
| Interface_7 | A-A3 |
| Interface_8 | A-A2 |
| Interface_9 | A-E |

TABLE 4-4

| Symbol | Local Interface |
|---|---|
| Interface_1 | Not applicable |
| Interface_10 | F-B |
| Interface_11 | F-E |
| Interface_2 | Not applicable |
| Interface_3 | Not applicable |
| Interface_4 | Not applicable |
| Interface_5 | Not applicable |
| Interface_6 | Not applicable |
| Interface_7 | Not applicable |
| Interface_8 | Not applicable |
| Interface_9 | F-G |

TABLE 4-5

| Symbol | Local Interface |
|---|---|
| Interface_1 | G-G2 |
| Interface_10 | G-F |
| Interface_11 | G-C |
| Interface_2 | G-G1 |
| Interface_3 | G-G3 |
| Interface_4 | G-G6 |
| Interface_5 | G-G7 |
| Interface_6 | G-G5 |
| Interface_7 | G-G4 |
| Interface_8 | G-G8 |
| Interface_9 | G-H |

TABLE 4-6

| Symbol | Local Interface |
|---|---|
| Interface_1 | Not applicable |
| Interface_10 | E-A |
| Interface_11 | E-E1 |
| Interface_2 | Not applicable |
| Interface_3 | Not applicable |
| Interface_4 | Not applicable |
| Interface_5 | E-E5 |
| Interface_6 | E-E4 |
| Interface_7 | E-E3 |
| Interface_8 | E-E2 |
| Interface_9 | E-F |

TABLE 4-7

| Symbol | Local Interface |
|---|---|
| Interface_1 | Not applicable |
| Interface_10 | H-H2 |
| Interface_11 | H-D |
| Interface_2 | H-H1 |
| Interface_3 | H-H3 |

TABLE 4-7-continued

| Symbol | Local Interface |
|---|---|
| Interface_4 | H-H6 |
| Interface_5 | H-H7 |
| Interface_6 | H-H5 |
| Interface_7 | H-H4 |
| Interface_8 | H-H8 |
| Interface_9 | H-G |

Figure 7:
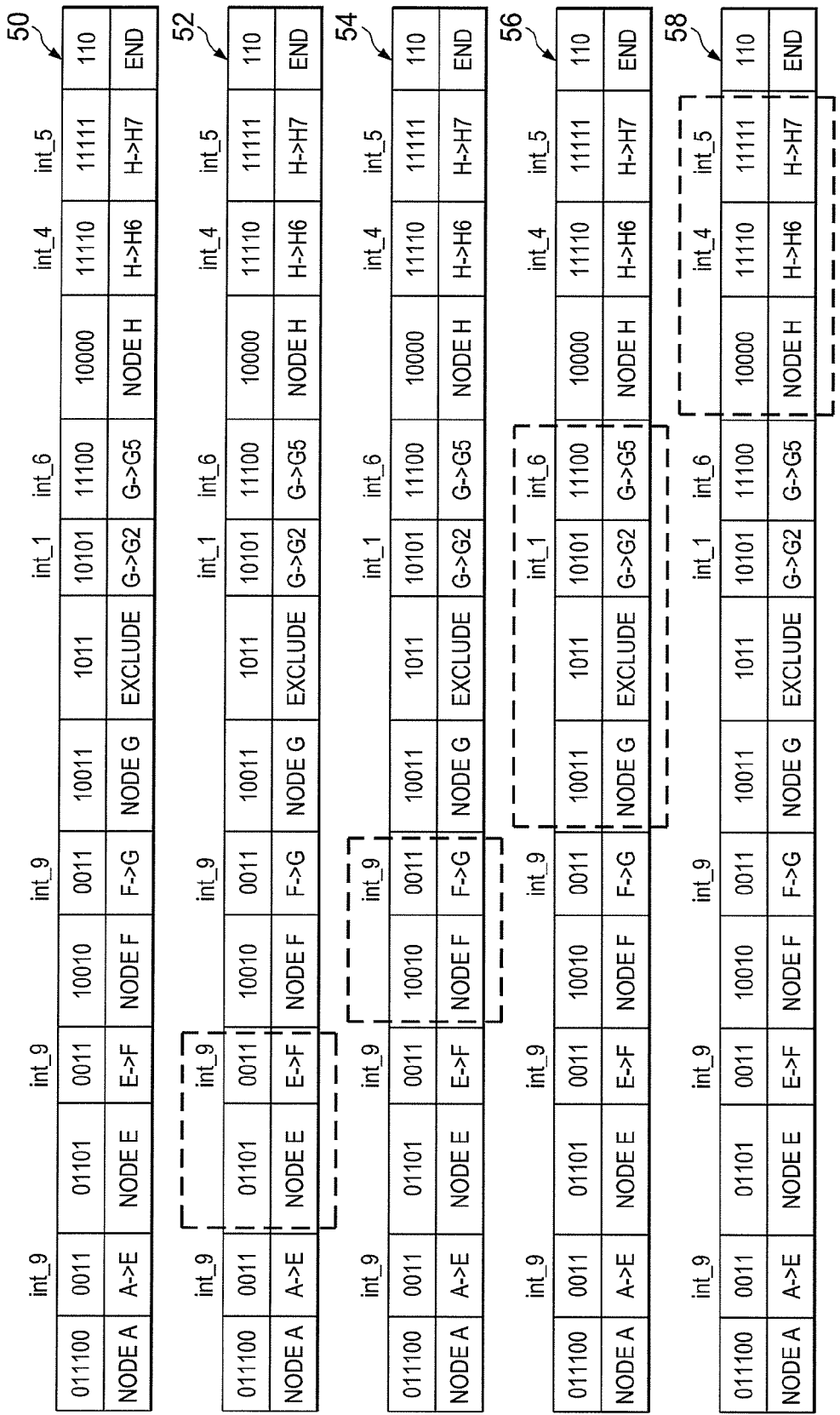
FIG. 7 illustrates the headers of a data packet for an embodiment having variable length globally unique node, globally unique but locally assigned link and action codewords including packet forwarding.

Referring to FIG. 7, the initial header created by controller 16 for the packet data routing shown in FIG. 6 is shown at 50. In this example, the header is forwarded as is to the next node over the interface(s) represented by the codeword(s), i.e. the codewords representing the local outgoing links are not removed. The header used for forwarding from node E to node F is shown at 52, the header for forwarding from node F to node G is shown at 54, the header for forwarding from node G to the nodes G3, G6 and G8 and also to node H is shown at 56, and the header for forwarding from node H to the nodes H6 and H7 is shown at 58. At nodes G3, G6 and G8, as codewords for nodes G3, G6 and G8 respectively are not found in the header, the header is removed.

According to another embodiment of the disclosure, variable-length globally unique link codes are used but the link codes are scoped to a node so the same codewords assigned to links can be reused at all nodes, requiring fewer codewords for links at the expense of requiring codewords to represent the multicast tree branching structure. This method is based on the assignment of globally unique codewords to links/interfaces and action codewords by the controller 16. The codewords could be Huffman or arithmetic coding or other lossless coding techniques but the links/interfaces and action actions share the same alphabet. The header includes a coded representation of all links in network 10 to traverse. Each node parses the codeword to find all interfaces over which to forwarding the data packet. For each interface, it strips the corresponding embedded header (between branch entry/exit codewords) and uses this to construct the header for that interface. The header structure is as follows:

```
<header> ::= <branch_instructions>
<end_header_code>
<branch_instructions> ::= <if_code>
[<branch_entry_code> <branch_instructions>
<branch_exit_code>] [<branch_instructions>]
```

Figure 8:
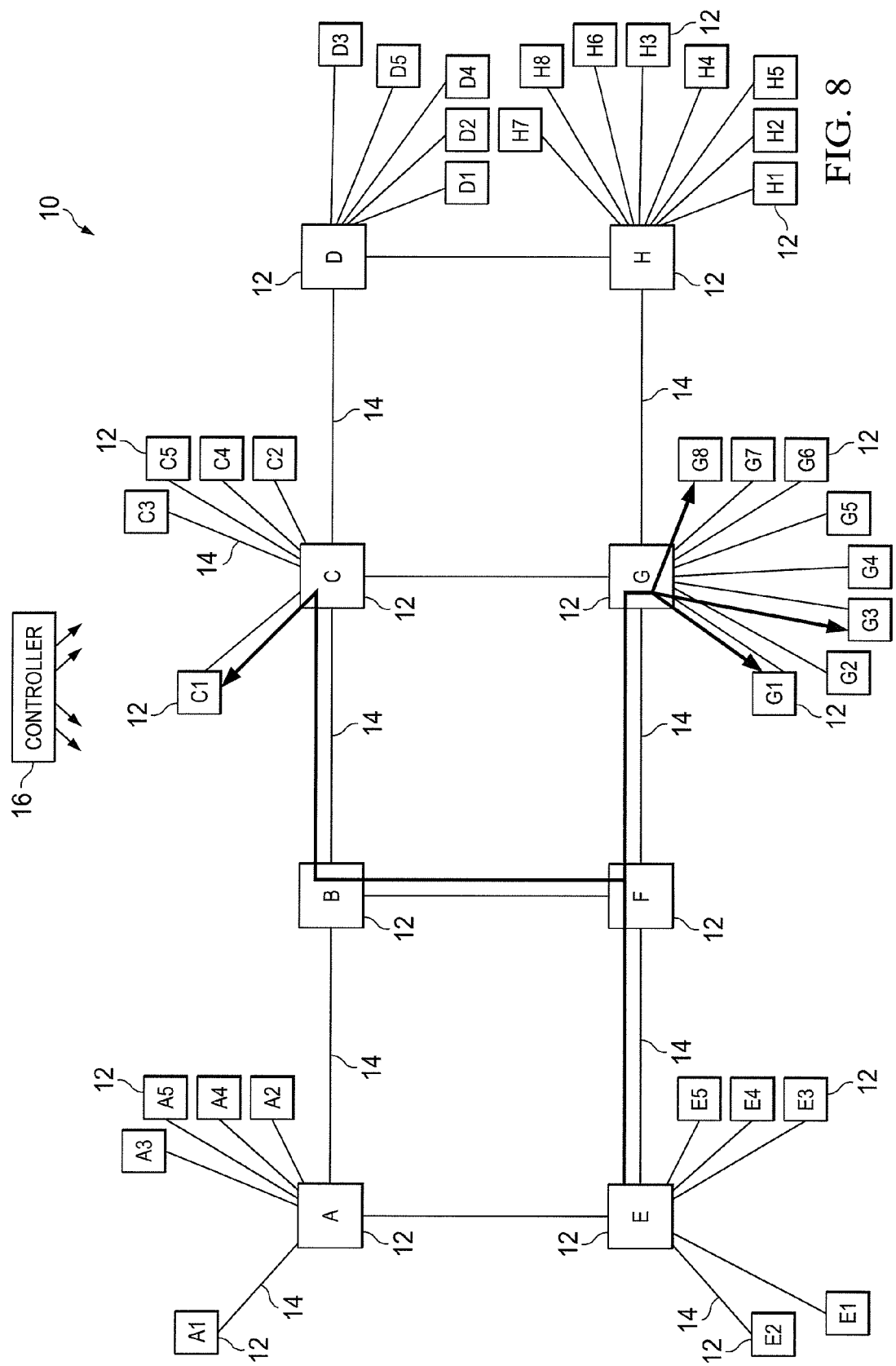
FIG. 8 illustrates a multicast network illustrating a path of a data packet according to another embodiment.

An example of this embodiment is shown as a data packet traversing a route in network 10 as shown in FIG. 8. The controller 16 performs several steps. Controller 16 finds the number of interfaces for each node to determine the number of interface symbols required. It determines the number of other codes requiring a symbol, for example to indicate the branch structure entry and exit point. It assigns a probability to each symbol based on the relative priority that it will occur in headers, and computes the variable-length codewords for all symbols as shown in Table 5-1 below:

TABLE 5-1

| Symbol | Probability | Variable-Length Code |
|---|---|---|
| code_branch_enter | 9 | 111 |
| code_branch_exit | 9 | 00 |
| code_end_header | 10 | 01 |
| Interface_1 | 1 | 1101110 |

TABLE 5-1-continued

| Symbol | Probability | Variable-Length Code |
|---|---|---|
| Interface_10 | 3 | 1001 |
| Interface_11 | 3 | 1010 |
| Interface_2 | 1 | 1101111 |
| Interface_3 | 1 | 110110 |
| Interface_4 | 2 | 11000 |
| Interface_5 | 2 | 11001 |
| Interface_6 | 2 | 10110 |
| Interface_7 | 2 | 10111 |
| Interface_8 | 2 | 11010 |
| Interface_9 | 3 | 1000 |

The controller 16 informs the nodes of network 10 of the codewords as shown in Table 5-2 below:

TABLE 5-2

| Symbol | Variable-Length Code |
|---|---|
| code_branch_enter | 111 |
| code_branch_exit | 00 |
| code_end_header | 01 |
| Interface_1 | 1101110 |
| Interface_10 | 1001 |
| Interface_11 | 1010 |
| Interface_2 | 1101111 |
| Interface_3 | 110110 |
| Interface_4 | 11000 |
| Interface_5 | 11001 |
| Interface_6 | 10110 |
| Interface_7 | 10111 |
| Interface_8 | 11010 |
| Interface_9 | 1000 |

In addition, the controller 16 sends local mapping of interface symbols to the local interfaces to each node. For example, the local mapping for node C is shown in Table 5-3, node F is shown in Table 5-4, node G is shown in Table 5-5, node E is shown in Table 5-6, and node B is shown in Table 5-7.

TABLE 5-3

| Symbol | Local Interface |
|---|---|
| Interface_1 | Not applicable |
| Interface_10 | C-B |
| Interface_11 | C-D |
| Interface_2 | Not applicable |
| Interface_3 | Not applicable |
| Interface_4 | C-C1 |
| Interface_5 | C-C5 |
| Interface_6 | C-C4 |
| Interface_7 | C-C3 |
| Interface_8 | C-C2 |
| Interface_9 | C-G |

TABLE 5-4

| Symbol | Local Interface |
|---|---|
| Interface_1 | Not applicable |
| Interface_10 | F-B |
| Interface_11 | F-E |
| Interface_2 | Not applicable |
| Interface_3 | Not applicable |
| Interface_4 | Not applicable |
| Interface_5 | Not applicable |
| Interface_6 | Not applicable |
| Interface_7 | Not applicable |
| Interface_8 | Not applicable |
| Interface_9 | F-G |

TABLE 5-5

| Symbol | Local Interface |
|---|---|
| Interface_1 | G-G2 |
| Interface_10 | G-F |
| Interface_11 | G-C |
| Interface_2 | G-G1 |
| Interface_3 | G-G3 |
| Interface_4 | G-G6 |
| Interface_5 | G-G7 |
| Interface_6 | G-G5 |
| Interface_7 | G-G4 |
| Interface_8 | G-G8 |
| Interface_9 | G-H |

TABLE 5-6

| Symbol | Local Interface |
|---|---|
| Interface_1 | Not applicable |
| Interface_10 | E-A |
| Interface_11 | E-E1 |
| Interface_2 | Not applicable |
| Interface_3 | Not applicable |
| Interface_4 | Not applicable |
| Interface_5 | E-E5 |
| Interface_6 | E-E4 |
| Interface_7 | E-E3 |
| Interface_8 | E-E2 |
| Interface_9 | E-F |

TABLE 5-7

| Symbol | Local Interface |
|---|---|
| Interface_1 | Not applicable |
| Interface_10 | B-C |
| Interface_11 | B-F |
| Interface_2 | Not applicable |
| Interface_3 | Not applicable |
| Interface_4 | Not applicable |
| Interface_5 | Not applicable |
| Interface_6 | Not applicable |
| Interface_7 | Not applicable |
| Interface_8 | Not applicable |
| Interface_9 | B-A |

Figure 9:
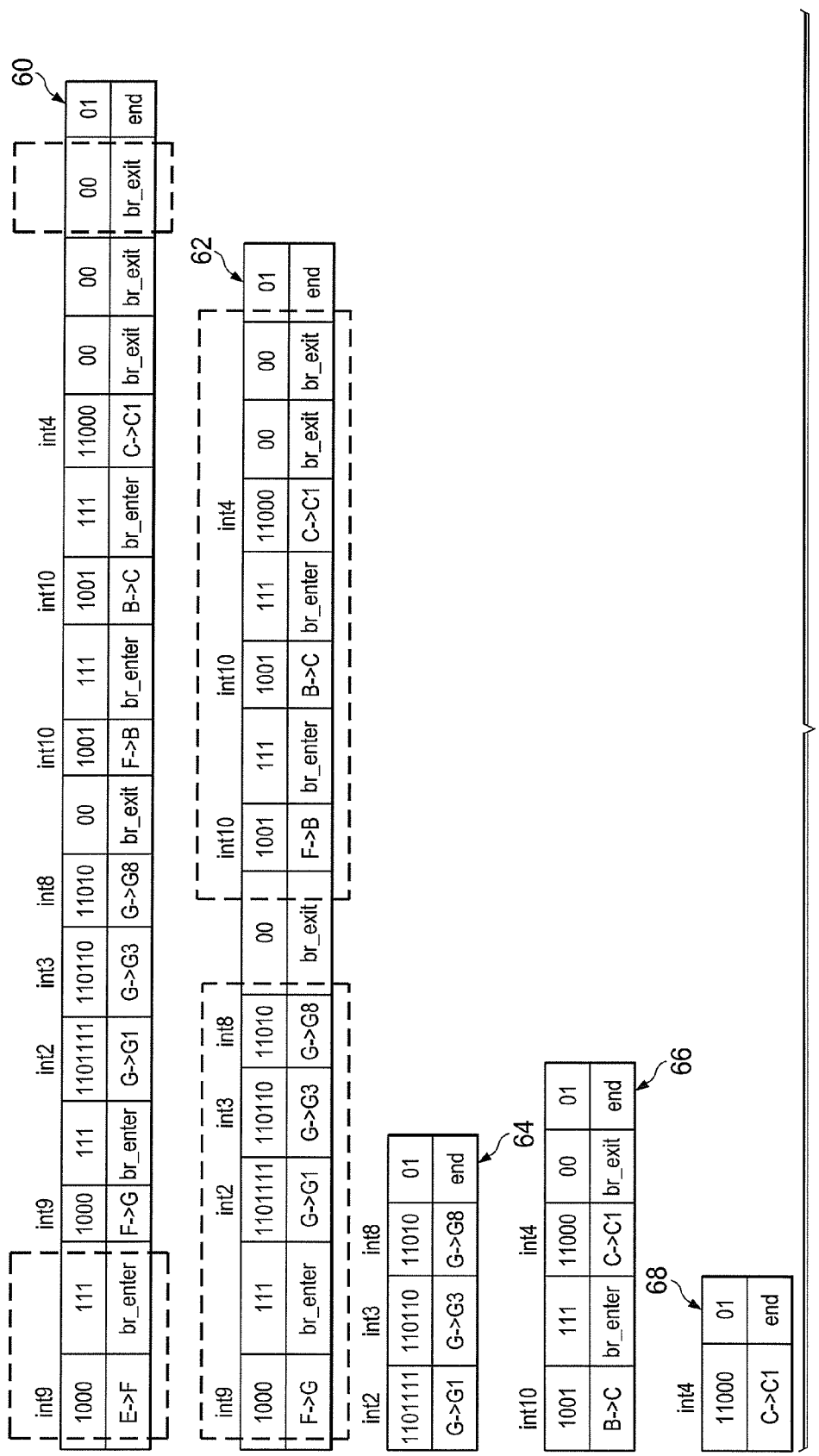
FIG. 9 illustrates the headers of a data packet for an embodiment having variable length unique link codewords relying on embedded branch codewords, including packet forwarding.

This is the example structured branch determined by controller 16:
- E: send on E-F: F-G, branch_enter, G-G1, G-G3, G-G8, branch_exit, F-B, branch_enter, B-C, branch_enter, C-C1, branch_exit, branch_exit, branch_exit, end
- F: send on F-G: branch_enter, G-G1, G-G3, G-G8, branch_exit, end
- G: send on {G-G1,G-G3,G-G8}: no header
- B: send on B-C: branch_enter, C-C1, branch_exit, end
- C: send on C-C1: no header The controller 16 provides the headers to source node E to use for the particular traffic flow for a multicast tree shown in FIG. 8. The header shown in FIG. 9 at 60 is used by node E to determine that the data packet should be forwarded to node F through interface E-F. Node E removes three codewords: the codeword representing the E-F link, codeword representing the structured branch entry point and the structured exit point before forwarding the data packet to node F on outgoing link E-F with header 62. The header 62 is used by node F to determine that the data packet should be forwarded on outgoing interfaces F-G and F-B. Node F constructs two headers, extracting the information from the branching structure that is relevant to send over the outgoing interfaces F-G and F-B. The header 64 is constructed by node F and forwarded on outgoing interface F-G. The header 66 is constructed by node F and forwarded on outgoing interface F-B. The header 64 is used by node G to determine that the data packet should be forwarded on outgoing interfaces G-G1, G-G3 and G-G8. Node G removes the codewords representing G-G1,G-G3 and G-G8 from the header, determines that there are no other entries in the header and removes the header before forwarding the data packet over interfaces G-G1, G-G3 and G-G8. The header 66 is used by node B to determine that the data packet should be forwarded on outgoing interfaces B-C. Node B removes the codeword representing link B-C from the header resulting in header 68 before forwarding the data packet on outgoing link B-C. The header 68 is used by node C. Node C determines that the data packet should be forwarded on outgoing interface C-C1. Node C removes the codeword representing link C-C1 from the header, determines that there are no other entries in the header and removes the header before forwarding the data packet over interface C-C1.

According to another embodiment of the disclosure, to allow for multiple sets of codewords to be made available within the same network, such as network 10:

<multi_coding_header>::=<encoding_type_code>
<header>

Where the header consists of one of the headers previously described or a different type of header.

This can be used when the controller 16 determines that not one set of codewords will satisfy all the multicast trees' needs and chooses representations using different sets of codewords for different trees.

This can also be used to migrate a tree from one representation to another.

For example, if 4 sets of codewords are used in the network 10, one based on each set having the following relative probability:

Encoding1:1
Encoding2:1
Encoding3:3
Encoding4:10

The example variable-length codewords assigned for the encoding_type_code for each set of codewords:

Encoding1:000
Encoding2:001
Encoding3:01
Encoding4:1

More or less sets of codewords are possible and are within the scope of this disclosure.

For each of the previous embodiments the controller 16 computes and downloads the sets of codewords for all 4 sets of codewords to each node. For each set of codewords, the controller 16 provides the variable-length codeword that will be used in the header to represent this set of codewords is used.

Then, the controller 16 instructs the nodes to insert a particular header for each specified flow where the header includes a variable-length codeword to represent which set of codewords is used. In the packet forwarding approach previously described, the first codeword will be examined at each node and the corresponding set of codewords determined. The corresponding encoding table will be used to decode the remaining codewords in the header and determine how to forward the data packet.

The set of codewords may be modified for a particular flow. The controller 16 instructs the nodes to insert a particular header for each specified flow that is different from the header that was previously specified so the node modifies its forwarding table entry for that particular flow.

For example, if the previous header was A, the new header is A', where the header A is using one set of codewords scheme and header A' uses a different set of codewords.

Multicast Networks

Advantageously, at one bit per network link (bit-field), a small multicast network with large trees can be represented in a fixed compact format (e.g. a 256 links network can be represented using the equivalent of 8 MPLS labels).

With globally unique link codewords, even large multicast networks can be represented with a more compact format than current MPLS headers. For example, a 65536 links network requires an average 16 bits per link. This allows small trees in large networks to be represented more efficiently.

With an exclusion list and broadcast codewords, large trees where packets are replicated on a large percentage of the total number of interfaces can be represented more efficiently.

Multicast Tree Branch Structure

This disclosure provides a method to decrease the multicast tree representation size by providing variable length codewords to represent the branching structure, i.e. replication points, and links.

Multiple Representations

Multiple representations allow for optimization for various multicast trees and network configurations even within a single network and allow for changes in the selected representation method by including a codeword to represent which set of codewords is used in the for the other codewords present in the header.

Figure 10:
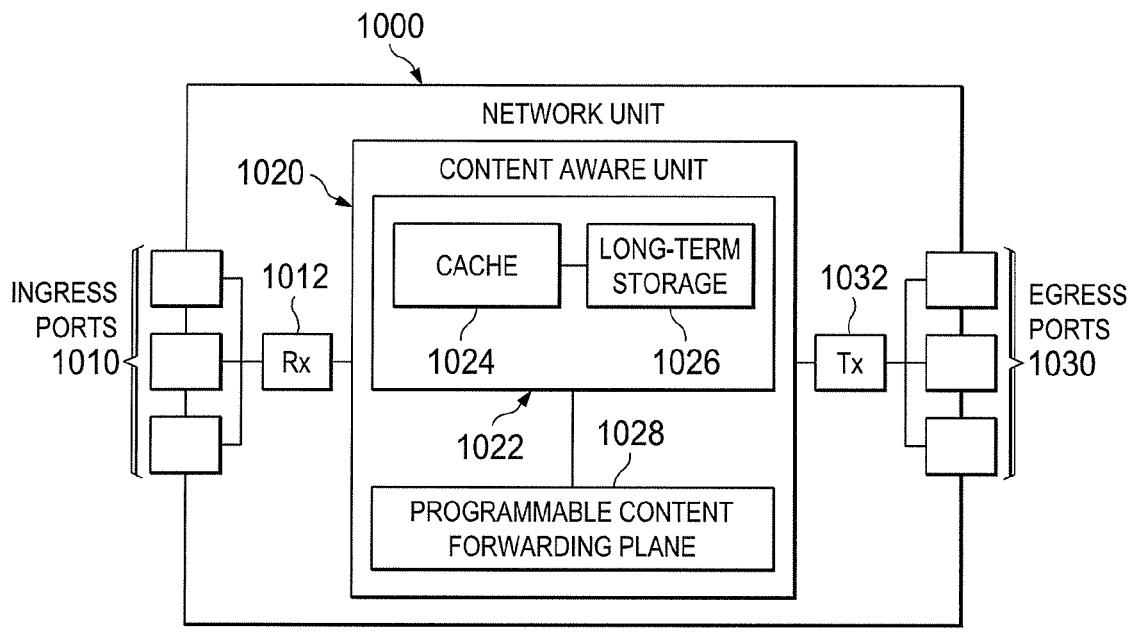
FIG. 10 illustrates an embodiment of a network unit in the multicast network.

FIG. 10 illustrates an embodiment of a network unit 1000, which may be any device that transports and processes data through network 10. For instance, the network unit 1000 may correspond to or may be located in any of the system nodes described above, such as the device or server described as above, for example, the controller, nodes and branches as described above. The network unit 1000 may correspond to or may be located in any of the system nodes described above. The network unit 1000 may also be configured to implement or support the schemes and methods described above. The network unit 1000 may comprise one or more ingress interfaces or units 1010 coupled to a receiver (Rx) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress interfaces or units 1030 coupled to a transmitter (Tx) 1032 for transmitting signals and frames/data to the other network components. The receiver 1012, content aware unit 1020, and transmitter 1032 may also be configured to implement at least some of the disclosed schemes and methods above, which may be based on hardware, software, or both. The components of the network unit 1000 may be arranged as shown in FIG. 10.

The content aware unit 1020 may also comprise a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 11:
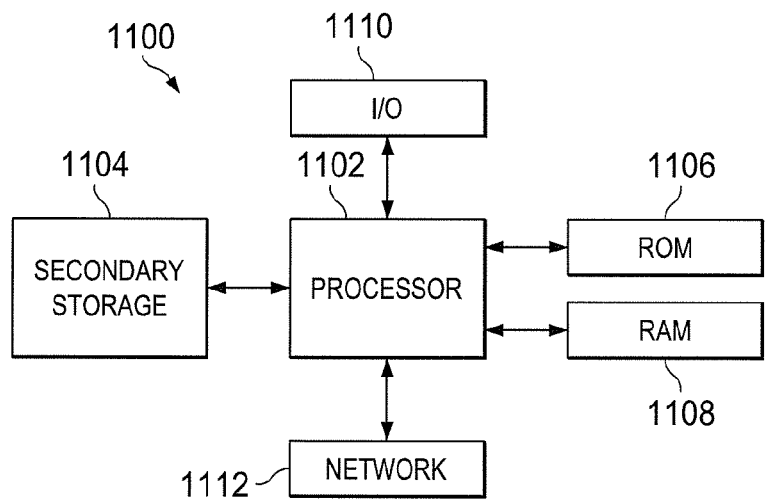
FIG. 11 illustrates a typical, general-purpose network component in the multicast network.

The network components described above may be implemented on any general-purpose network component, such as a computer or network component with sufficient processing power, memory resources, and network throughput capability to handle the necessary workload placed upon it. FIG. 11 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. In a source routed forwarding network comprising a plurality of nodes configured to transfer data packets to one another via a plurality of links, a method comprising:
a forwarding node forwarding a data packet to another said node in accordance with a header defining a path of the data packet from a source to multiple destinations, wherein the header includes an ordered set of codewords, wherein a controller controlling each of the plurality of nodes establishes an order of the codewords in the header such that the codewords, when locally interpreted in the order by one or more of the nodes, cause the data packet to traverse the path, wherein the controller has, prior to establishing the order of the codewords in the header, sent to each of the plurality of nodes a list indicating an assigned codeword for each of a plurality of local interpretations potentially to be made by any of the plurality of nodes, and wherein the forwarding node processes the header, decodes codewords, identifies outgoing interfaces that are local to the forwarding node as represented by the codewords, and sends a source routed forwarding header and the data packet on to the outgoing interfaces.

2. The method of claim 1 wherein the codewords are variable-length.

3. The method of claim 1 wherein the local interpretations comprise at least one of: a node to which the codewords are applicable, forwarding on an interface, an end of header, a branch entry or exit point, a beginning or an end of an exclusion list, and broadcasting.

4. The method of claim 1 where multiple sets of the codewords are present and the forwarding node chooses which one to use based on a presence of a codeword in the header.

5. The method of claim 1 wherein the set of codewords that represent the outgoing interfaces are removed from the header to create the source routed forwarding header.

6. The method of claim 1 wherein the source routed forwarding header is constructed from a subset of codewords from the header.

7. The method of claim 1 wherein one of said codewords is modified to indicate it was already processed by substituting the one codeword with another codeword.

8. In a source routed forwarding network comprising a plurality of nodes configured to transfer data packets to one another via a plurality of links:
a controller configured to control each of the plurality of nodes, the controller configured to control forwarding of a data packet by establishing a header that defines a path of the data packet from a source to multiple destinations, wherein the header consists of an ordered set of codewords that, when locally interpreted by one or more of the nodes, cause the data packet to traverse the path, the controller further configured to establish each of the nodes in the network to process the header, decode the codewords, identify outgoing interfaces that are local to the said node as presented by the codewords, and construct a forwarding header for each of the outgoing interfaces before sending the data packet on to the outgoing interfaces.

9. The controller as specified in claim 8 wherein the controller is configured to establish a codeword for each of the plurality of links.

10. The controller as specified in claim 8 wherein the controller is configured to establish some of the codewords having different lengths.

11. The controller as specified in claim 8 wherein the controller is configured to establish the header to include one said codeword to be representative of the set of codewords used in the header of the data packet.

12. The controller as specified in claim 11 wherein the controller is configured to monitor a length of the header, and establish a different set of codewords when the length of the header exceeds a predetermined threshold.

13. The controller as specified in claim 8 wherein the controller is configured to provide the set of codewords and local interpretations associated with the codewords to each of the nodes in the network prior to establishing the header.

14. The controller as specified in claim 13 where the controller is configured to provide a mapping of one said codewords to one of the following local interpretations: local node identification, instruction to forward on an outgoing interface/link, a representation of a beginning or an end of an exclusion list, a beginning or an end of a representation of a branch end of the header, or locally ignore.

15. The controller as specified in claim 8 wherein the controller is configured to establish a single fixed length codeword and each link in the network is represented as a bit field.

16. The controller as specified in claim 8 wherein the controller is configured to establish the set of codewords to represent the plurality of links in the path.

17. The controller as specified in claim 8 wherein the controller is configured to assign unique said codewords to the plurality of nodes.

18. The controller as specified in claim 8 wherein the controller is configured to assign the codewords to one of the following: a representation of an end of the header, a branch entry point, a branch exit point, a beginning or end of a list of hops to exclude, and instructions to broadcast.

19. In a source routed forwarding network comprising a plurality of nodes configured to transfer data packets to one another via a plurality of links, a method comprising:

a controller controlling each of the plurality of nodes, the controller establishing forwarding of a data packet by establishing a header that defines a path of the data packet from a source to multiple destinations, wherein the header consists of an ordered set of codewords that, when locally interpreted by one or more of the nodes, cause the data packet to traverse the path, the controller further establishing each of the nodes in the network to process the header, decode the codewords, identify outgoing interfaces that are local to the said node as presented by the codewords, and construct a forwarding header for each of the outgoing interfaces before sending the data packet on to the outgoing interfaces.

20. The method as specified in claim 19, the controller establishing a unique codeword for each of the plurality of links.

21. The method as specified in claim 20, the controller establishing some of the codewords having different lengths.

22. The method as specified in claim 20, the controller providing the set of codewords and local interpretations associated with the codewords to each of the nodes in the network prior to establishing the header.

23. The method as specified in claim 19, the controller establishing the header to include one said codeword to be representative of the set of codewords used in a data packet header.

24. The method as specified in claim 23, the controller monitoring a length of the header, and establishing a different set of codewords when the length of the header exceeds a predetermined threshold.

25. The method as specified in claim 19, the controller assigning global codewords to the plurality of nodes, and assigning global codewords to, and locally mapping to, the plurality of links.

26. The method as specified in claim 19, the controller assigning codewords to instructions, an end of header, a branch entry, a branch exit, an exclusion, and a broadcast.

* * * * *